(12) United States Patent
Kitamura

(10) Patent No.: US 8,673,483 B2
(45) Date of Patent: Mar. 18, 2014

(54) SEALED BATTERY

(75) Inventor: Ryosuke Kitamura, Kyoto (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 0 days.

(21) Appl. No.: 13/204,389

(22) Filed: Aug. 5, 2011

(65) Prior Publication Data

US 2012/0034511 A1 Feb. 9, 2012

(30) Foreign Application Priority Data

Aug. 6, 2010 (JP) ................................. 2010-177685

(51) Int. Cl.
*H01M 2/00* (2006.01)
(52) U.S. Cl.
USPC ........... 429/163; 429/165; 429/168; 429/171; 429/174; 429/177
(58) Field of Classification Search
USPC ........... 429/65, 163, 164, 174, 184, 165, 168, 429/171, 177
See application file for complete search history.

(56) References Cited

U.S. PATENT DOCUMENTS

| | | | |
|---|---|---|---|
| 5,716,729 A * | 2/1998 | Sunderland et al. ............ | 429/66 |
| 5,976,729 A | 11/1999 | Morishita et al. | |
| 6,586,134 B2 * | 7/2003 | Skoumpris ..................... | 429/178 |
| 2003/0134193 A1 * | 7/2003 | Hanafusa et al. ............. | 429/181 |
| 2009/0136843 A1 | 5/2009 | Yamamoto et al. | |

FOREIGN PATENT DOCUMENTS

| | | |
|---|---|---|
| JP | 3066338 B2 | 7/2000 |
| JP | 3349495 B2 | 11/2002 |
| JP | 2002-373642 A | 12/2002 |
| JP | 3523530 B2 | 4/2004 |
| JP | 3675954 B2 | 7/2005 |
| JP | 2006-114272 A | 4/2006 |
| JP | 2007-317577 A | 12/2007 |
| JP | 2009-152183 A | 7/2009 |
| JP | 2009-295548 A | 12/2009 |
| JP | 2010-123410 A | 6/2010 |

\* cited by examiner

*Primary Examiner* — Patrick Joseph Ryan
*Assistant Examiner* — Alex Usyatinsky
(74) *Attorney, Agent, or Firm* — Birch, Stewart, Kolasch & Birch, LLP

(57) ABSTRACT

A sealed battery with an electrode assembly and electrolyte enclosed in a battery case is provided, where a connection member can be attached to the battery case without requiring large space while avoiding increasing the length of the lead wire. The sealed battery includes: a battery case enclosing an electrode assembly and electrolyte, for serving as a terminal of one polarity of the electrode assembly; an external terminal provided on the battery case in such a way that it is electrically insulated from the battery case, for serving as a terminal of another polarity of the electrode assembly; and a sealant member for sealing a fill port for the electrolyte provided side by side with the external terminal on the battery case. A connection member to which a lead wire is to be connected is provided on the battery case to cover at least part of the sealant member.

4 Claims, 4 Drawing Sheets

SEALED BATTERY

TECHNICAL FIELD

The present invention relates to a sealed battery including an electrode assembly and electrolyte enclosed in a battery case, the case having an external terminal and an electrolyte fill port.

BACKGROUND

Conventionally, sealed batteries are available that include a case enclosing an electrode assembly and electrolyte, the case having an external terminal and an electrolyte fill port. In such a sealed battery, the battery case serves as a terminal of one polarity, as disclosed in JP3523530B and JP3675954B, for example, and a connection member to which a lead wire is connected (i.e. a conductive connection for the positive electrode and a current extracting lead plate) is attached to the battery case. The connection member is composed of a clad material having a layer of the same metal material that forms the battery case and a layer of the same metal material that forms the lead wire. The connection member is attached to the battery case in such a way that the layer of the same metal material forming the battery case is in contact with the battery case.

SUMMARY

As smaller and lighter devices are becoming available, attempts are being made to make smaller batteries used in such devices. In addition, a battery case has an external terminal, a fill port, a vent that cleaves up when the internal pressure rises, and the like, all arranged on it side by side. As such, a small battery has insufficient space around its external terminal for a connection member as disclosed in JP3523530B and JP3675954B. Further, welding may be employed to fix the connection member to the battery case, requiring additional space, thereby making it difficult to attach the connection member to the battery case.

Alternatively, a connection member may be attached to the end of the battery case opposite to the end with the external terminal. In order to provide connection between a lead wire connected to the connection member and circuitry outside the battery, the lead wire must extend from the end of the battery case opposite to the end with the external terminal all the way to the external terminal end, resulting in an increased length of the lead wire.

A sealed battery is provided including an electrode assembly and electrolyte enclosed in a battery case, where a connection member can be attached to the battery case without requiring large space while avoiding increasing the length of a lead wire.

A sealed battery according to an embodiment of the invention includes: a battery case in which an electrode assembly and electrolyte are enclosed, for serving as a terminal of one polarity of the electrode assembly; an external terminal provided on the battery case in such a way that it is electrically insulated from the battery case, for serving as a terminal of another polarity of the electrode assembly; a sealant member that seals a fill port for the electrolyte provided side by side with the external terminal on the battery case, wherein a connection member to which a lead wire is to be connected is provided on the battery case to cover at least part of the sealant member (the first arrangement).

According to the above arrangement, where a battery case serves as a terminal of one polarity and an external terminal and a fill port are formed on the battery case, a connection member to which a lead wire is to be connected can be positioned on the battery case without requiring large space. Specifically, a connection member is positioned so as to cover at least part of the sealant member that seals the fill port. Accordingly, a connection member can be attached to a battery case even in a smaller battery where devoted space cannot be provided for the connection member separate from the external terminal and the fill port.

The above arrangement also allows a connection member to be provided on the same end of the battery case as the end with the external terminal. Accordingly, this arrangement will reduce the length of the lead wire connected to the connection member compared with an implementation where a connection member is attached to the end opposite to the end with the external terminal and a lead wire extends all the way towards the end with the external terminal.

In the above first arrangement, it is preferable that the connection member includes a clad material having a layer of the same metal material that forms the battery case and a layer of the same metal material that forms the lead wire, and is attached to the battery case in such a way that the layer of the same metal material that forms the battery case abuts the battery case, and the layer of the same metal material of the connection member that forms the lead wire is connected to the lead wire (the second configuration).

Thus, the battery case can be firmly connected with the lead wire by means of the connection member composed of a clad material.

"Same metal material that forms the battery case", as used herein, means a material composed mainly of a metal that is common to a layer of the connection member and the battery case (accounting for 50 volume percent or more). "Same metal material that forms the lead wire", as used herein, means a material composed mainly of a metal that is common to a layer of the connection member and the lead wire (accounting for 50 volume percent or more).

In the above first arrangement, it is preferable that the battery case is shaped as a column, and the external terminal, the sealant member and the connection member are provided on one end of the column-shaped battery case along its the axial direction (the third arrangement).

Thus, in an arrangement where the external terminal and the sealant member are provided in one cluster on an end of the battery case and thus there is little space for the connection member, providing a connection member to cover at least part of the sealant member as in the above first arrangement will allow the connection member to be positioned without requiring large space.

In the above second arrangement, it is preferable that the sealant member is joined to a periphery of the fill port of the battery case using welding and the lead wire is joined to the connection member using welding, and the layer of the connection member that is made of the same metal material that forms the lead wire has a thickness larger than that of the lead wire (the fourth arrangement).

In an arrangement where the sealant member is joined to the periphery of the fill port using welding and the lead wire is to be joined to the connection member using welding, heat from the welding may cause the weld between the sealant member and the periphery of the fill port to melt again depending on the thickness of the connection member. This may create a gap in the weld between the sealant member and the periphery of the fill port, which may cause leakage of electrolyte from inside the battery.

If as discussed above, the thickness of the layer of the connection member that is made of the same metal material that forms the lead wire is larger than that of the lead wire, it will prevent the weld between the sealant member and the periphery of the fill port from melting again during the welding of the connection member and the lead wire. Accordingly, the above arrangement will prevent a gap from forming in the weld between the sealant member and the periphery of the fill port during the welding of the connection member and the lead wire, thus preventing leakage of electrolyte.

In the fourth arrangement, it is preferable that the layer of the connection member that is made of the same metal material that forms the lead wire has a thickness twice that of the lead wire or larger (the fifth arrangement). This will prevent the portion of the connection member where it is connected to the battery case from melting when the connection member is joined to the lead wire using welding. This will further prevent the weld between the sealant member and the periphery of the fill port from melting again.

In the above fourth arrangement, it is preferable that the lead wire is joined to the connection member using resistance welding (the sixth arrangement). If the lead wire is to be joined to the connection member using resistance welding, the portions of the lead wire and the connection member that are in contact with each other are particularly melted. Thus, if the thickness of that layer of the connection member which is made of the same metal material that forms the lead wire is larger than that of the lead wire, as in the fourth arrangement, it will prevent the weld between the sealant member and the periphery of the fill port from melting again.

In the above first arrangement, it is preferable that the connection member is welded to the battery case at at least two locations that sandwich the sealant member, and the lead wire is joined, using welding, between the locations where the connection member is welded to the battery case (the seventh arrangement).

In this arrangement, the lead wire is welded at different locations of the connection member from those where the connection member is welded to the battery case. This will allow the lead wire to be welded to a relatively flat portion of the connection member. This will ensure welding strength between the lead wire and the connection member. In addition, welding the connection member to the battery case at at least two locations that sandwich the sealant member will ensure welding strength between the connection member and the battery case.

In a sealed battery according to one embodiment, a connection member to which a lead wire is to be connected is provided on the battery case to cover at least part of the sealant member that seals the electrolyte fill port. This will allow the connection member to be positioned on the battery case without requiring large space.

Further, if the thickness of that layer of the connection member composed of a clad material which is made of the same metal material that forms the lead wire is larger than that of the lead wire, it will prevent the weld between the sealant member and the periphery of the fill port from melting when the lead wire is welded to the connection member, thus preventing a gap from forming. This will prevent leakage of electrolyte through the weld between the sealant member and the periphery of the fill port. Particularly, if the thickness of that layer of the connection member which is made of the same metal material that forms the lead wire is twice that of the lead wire or larger, it will further prevent leakage of electrolyte through the weld between the sealant member and the periphery of the fill port.

DETAILED DESCRIPTION

Figure 1:
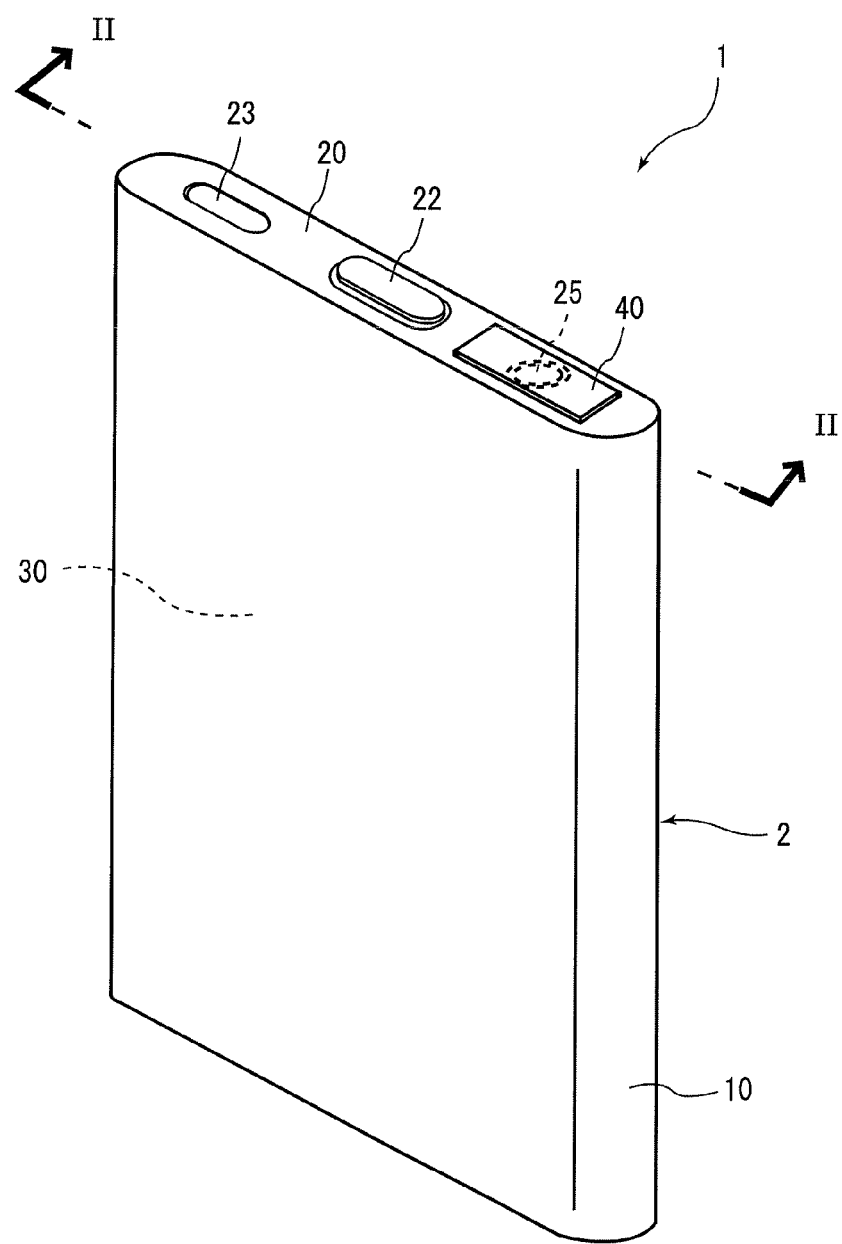
FIG. 1 is a schematic perspective view of a sealed battery of an embodiment.

An embodiment will be described in detail below with reference to the drawings. Identical or corresponding parts are given the same reference numerals throughout the drawings and will not be described repeatedly.

Overall Arrangement

FIG. 1 is a schematic perspective view of a sealed battery 1 of an embodiment. The sealed battery 1 includes: an exterior can 10 in the form of a cylinder with a bottom; a cap 20 that covers the opening of the exterior can 10; and an electrode assembly 30 contained in the exterior can 10. The exterior can 10 together with the attached cap 20 forms a hollow cylindrical battery case 2. It should be noted that, in addition to the electrode assembly 30, non-aqueous electrolyte (hereinafter referred to as "electrolyte"), not shown, is enclosed in the battery case 2.

Figure 2:
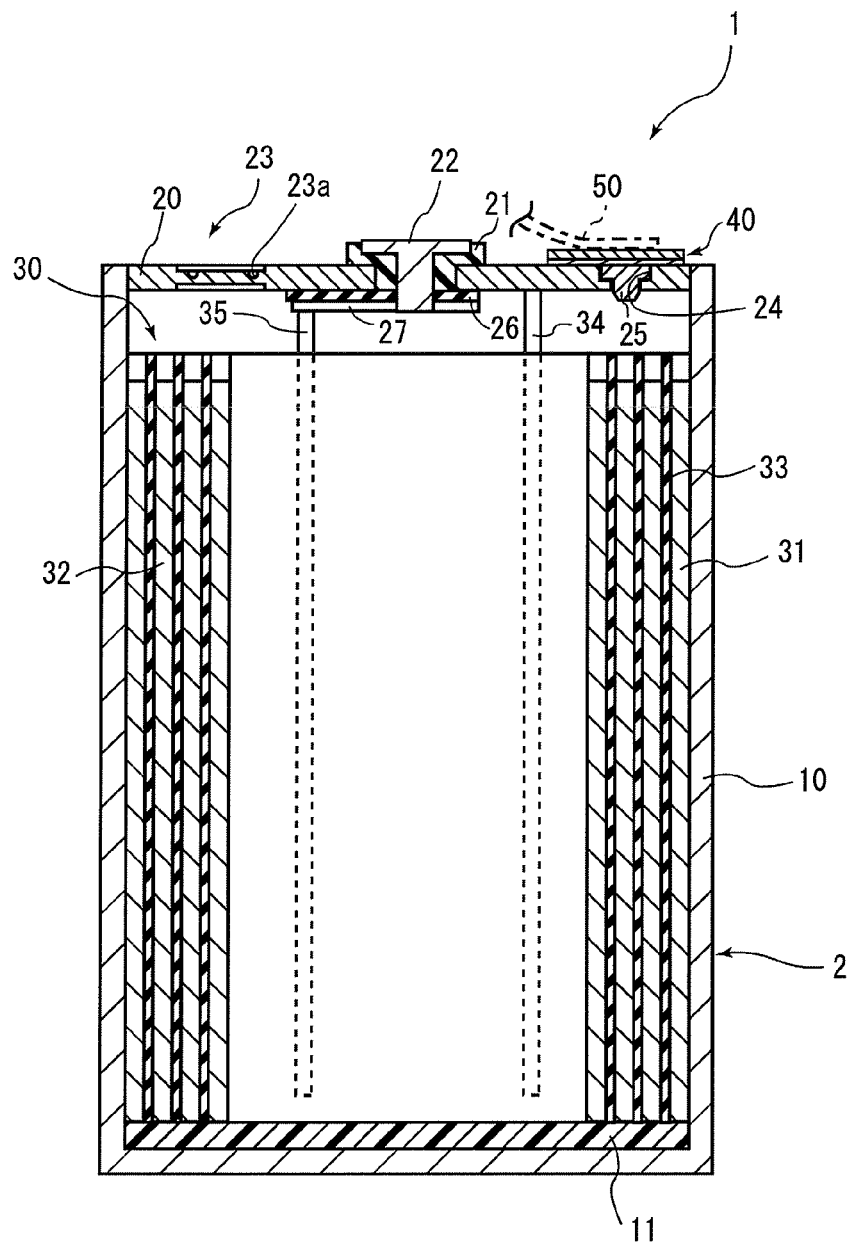
FIG. 2 is a cross section of the battery along the line II-II in FIG. 1.

The electrode assembly 30 is a jellyroll electrode assembly formed of a stacked and spirally wound sheet-shaped positive electrode 31 and negative electrode 32, where a separator 33 is placed between the two electrodes and under the negative electrode 32, for example, as shown in FIG. 2. The positive electrode 31, negative electrode 32 and separator 33 are all stacked upon one another and spirally wound before being pressed to form a flattened electrode assembly 30.

FIG. 2 only shows a few outer layers of the electrode assembly 30. An illustration of an inner portion of the electrode assembly 30 is omitted in FIG. 2; of course, the positive electrode 31, negative electrode 32 and separator 33 exist in the inner portion of the electrode assembly 30. Also, an illustration of an insulator or the like located in the region on and near the back side of the cap 20 is omitted in FIG. 2.

The positive electrode 31 includes a positive electrode active material layer containing positive electrode active material provided on the both sides of a positive current collector made of metal foil, such as aluminum foil. Specifically, the positive electrode 31 is fabricated by applying a positive electrode mixture containing a positive electrode active material, a conductive aid, a binder and the like to the positive current collector of aluminum foil or the like, the positive electrode active material being a lithium-containing oxide that can occlude and discharge lithium ions, and drying the applied materials.

Preferably, lithium-containing oxides used as a positive electrode active material may include, for example, a lithium cobalt oxide such as $LiCoO_2$, a lithium manganese oxide such as $LiMn_2O_4$, or a lithium composite oxide including a lithium nickel oxide, such as $LiNiO_2$. It should be noted that just one positive electrode active material may be used, or two or more materials may be combined. Moreover, the positive electrode active materials are not limited to those mentioned above.

The negative electrode 32 includes a negative electrode active material layer containing negative electrode active material provided on the both sides of a negative current collector made of metal foil, such as copper foil. Specifically, the negative electrode 32 is fabricated by applying a negative electrode mixture containing a negative electrode active material, a conductive aid, a binder and the like to the negative current collector of copper foil or the like, the negative electrode active material being capable of occluding and discharging lithium ions, and drying the applied materials. Preferably, negative electrode active materials may include, for example, a carbon material that is capable of occluding and discharging lithium ions (graphites, pyrolytic carbons, cokes, glass-like carbons or the like). The negative electrode active materials are not limited to those mentioned above.

The positive electrode 31 of the electrode assembly 30 is connected with a positive lead 34, while the negative electrode 32 is connected with a negative lead 35. The positive and negative leads 34 and 35 extend to the outside of the electrode assembly 30. An end of the positive lead 34 is connected to the cap 20. An end of the negative lead 35 is connected to the negative terminal 22 via a lead plate 27, as described later.

The exterior can 10 is in the form of a cylinder with a bottom made of an aluminum alloy and, together with the cap 20, forms the battery case 2 in the form of a cylinder extending in the axial direction. More particularly, as shown in FIG. 1, the exterior can 10 is in the form of a cylinder with a bottom, extending in the axial direction and having a rectangular bottom with arc-like short sides. More specifically, the exterior can 10 is in a flattened shape where the thickness, which corresponds to the size of the short sides of the bottom, is smaller than the width, which corresponds to the size of the long sides of the bottom (for example, the thickness may be about one tenth of the width). Moreover, the exterior can 10 is joined to the cap 20 which is in turn connected to the positive lead 34, as described later, and thus can serve as a positive electrode (a terminal of one polarity) of the sealed battery 1.

As shown in FIG. 2, on the inside of the bottom of the exterior can 10 is placed an insulator 11 made of a polyethylene sheet for preventing a short circuit between the positive electrode 31 and the negative electrode 32 of the electrode assembly 30 via the exterior can 10. The electrode assembly 30 described above is positioned in such a way that one of its ends is on the insulator 11.

The cap 20 is joined to the opening of the exterior can 10 with laser welding to cover the opening of the exterior can 10. The cap 20 is made of an aluminum alloy, similar to the exterior can 10, and has arc-like short sides of the rectangle such that it can fit with the inside of the opening of the exterior can 10.

Further, the cap 20 has a through hole in the center in its longitudinal direction. Through this through hole pass an insulating packing 21 made of polypropylene and a negative terminal 22 (external terminal, terminal of the other polarity) made of stainless steel. Specifically, a generally cylindrical insulating packing 21 penetrated by a generally cylindrical negative terminal 22 fits with the periphery of the through hole. The negative terminal 22 has a flat portion integrally formed with one end of the cylindrical axle. The negative terminal 22 is positioned relative to the insulating packing 21 such that the flat portion is exposed to the outside while the axle is inside the insulating packing 21. Thus, the negative terminal 22 is electrically insulated from the cap 20. The other end of the axle of the negative terminal 22 is connected with a lead plate 27 made of stainless steel. An insulator 26 is placed between the lead plate 27 and the insulating packing 21 to cover the side of the lead plate 27 facing the cap 20.

A vent 23, the negative terminal 22 and electrolyte fill port 22 are arranged in this order on the cap 20. The vent 23 is formed by a groove 23a formed in the cap 20 in an ellipse as viewed in the thickness direction of the cap 20. The vent 23 cleaves up when the internal pressure of the sealed battery 1 is higher than a predetermined value. This is for preventing the interior pressure of the sealed battery 1 from becoming so high that the battery explodes.

Figure 3:
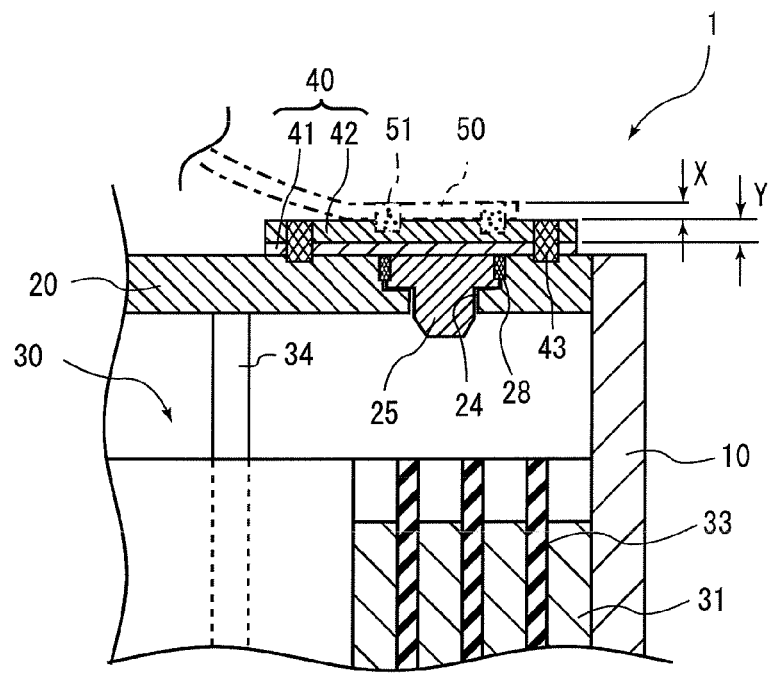
FIG. 3 is an enlarged cross section of the battery, showing the connection plate and the surrounding structure in FIG. 2.

The fill port 24 in the cap 20 is generally shaped as a circle. As shown in FIG. 3, the fill port 24 has a small diameter portion and a large diameter portion, and thus has two steps in diameter across the thickness direction of the cap 20. The fill port 24 is sealed with a seal plug 25 (i.e. a sealant member) formed stepwise consistent with the diameters of the fill port 24. In addition, the circumference of the large diameter portion of the seal plug 25 is joined to the periphery of the fill port 24 using laser welding (see numeral 28 of FIG. 3) to prevent a gap from forming between the seal plug 25 and the periphery of the fill port 24.

Connection Plate

As shown in FIG. 3, a connection plate 40 (i.e. a connection member) is attached to the cap 20 at a location that causes the plate to cover the seal plug 25 of the fill port 24. The connection plate 40 is formed of a clad material made of an aluminum alloy and a nickel alloy. The connection plate 40 is fixed to the cap 20 using laser welding in such a way that the aluminum alloy is in contact with the cap 20. Specifically, the connection plate 40 includes an aluminum alloy layer 41 made of the same metal material that forms the cap 20 and a nickel alloy layer 42 made of the same metal material that forms the nickel alloy lead wire 50. In the connection plate 40, the aluminum alloy layer 41 is joined to the cap 20, while the nickel alloy lead wire 50 is joined to the nickel alloy layer 42 using resistance welding. Moreover, the connection plate 40 is constructed such that, for example, the thickness of the nickel alloy layer 42 is about twice that of the aluminum alloy layer 41. The lead wire 50 is preferably flat, but may be in any shape as long as it can be joined to the nickel alloy layer 42 of the connection plate 40 using welding.

"Same metal material that forms the cap 20", as used herein, means a material composed mainly of a metal that is common to a layer of the connection plate 40 and the cap 20 (accounting for 50 volume percent or more). "Same metal material that forms the lead wire 50", as used herein, means a material composed mainly of a metal that is common to a layer of the connection plate 40 and the lead wire 50 (accounting for 50 volume percent or more). Such materials can be firmly joined to each other using welding.

In the present embodiment, the connection plate 40 covers the seal plug 25. However, the present embodiment is not limited to this, and the connection plate 40 may cover at least part of the seal plug 25.

As described above, fabricating the connection plate 40 from a clad material made of an aluminum alloy layer 41 and a nickel alloy layer 42 will allow the nickel alloy lead wire 50 to be firmly connected with the aluminum alloy cap 20 via the connection plate 40. In other words, while it is difficult to firmly join the lead wire 50 to the cap 20 using welding since they are made of different metals, interposing a connection plate 40 of a clad material as above will allow different metals to be firmly connected with each other.

Furthermore, providing a connection plate 40 covering the seal plug 25 of the fill port 24 will facilitate positioning the connection plate 40 in a limited area on the cap 20 of a small sealed battery 1. Thus, a positive lead wire 50 can be connected with the cap 20, which has a negative terminal 22, resulting in a reduced length of the lead wire 50 from the sealed battery 1 to the external circuitry.

As shown in FIG. 3, the thickness Y of the nickel alloy layer 42 of the connection plate 40 is larger than the thickness X of the nickel alloy lead wire 50. Having a thickness Y of the nickel alloy layer 42 larger than the thickness X of the lead wire 50 will prevent heat from being conducted to the cap 20 when the nickel alloy layer 42 is resistance-welded to the lead wire 50, thus preventing the weld between the periphery of the fill port 24 and the seal plug 25 from melting again.

Thus, as described later, even if the welds between the nickel alloy layer 42 and the lead wire 50 are located above the welds between the periphery of the fill port 24 of the cap 20 and the seal plug 25, it is possible to prevent the weld between the periphery of the fill port 24 and the seal plug 25 from melting again due to heat from resistance welding. Accordingly, it is possible to prevent a gap from forming in the weld between the periphery of the fill port 24 and the seal plug 25 during resistance welding, thereby preventing leakage of electrolyte from inside the sealed battery 1.

FIG. 3 illustrates an example of a relationship between welding locations for the cap 20, seal plug 25 and the connection plate 40. In FIG. 3, numeral 28 designates a weld between the periphery of the fill port 24 of the cap 20 and the seal plug 25; numeral 43 designates a weld between the cap 20 and the connection plate 40; and numeral 51 designates a weld between the connection plate 40 and the lead wire 50.

As described above, the periphery of the fill port 24 is joined to the seal plug 25 at the weld 28 using laser welding to prevent electrolyte leakage from between the periphery of the fill port 24 and the seal plug 25. More specifically, the weld 28 is shaped generally in a circle along the circumference of the seal plug 25 as viewed in the thickness direction of the cap 20. Further, the cap 20 is joined to the connection plate 40 at the welds 43 using laser welding. Two welds 43 are positioned one at each end of the rectangular connection plate 40 along its longitudinal direction. Furthermore, the connection plate 40 is joined to the lead wire 50 at the welds 51 using resistance welding. Two welds 51 are formed corresponding to the two electrode rods pressed against the lead wire 50 during resistance welding. That is, two welds 51 are formed simultaneously during resistance welding.

As shown in FIG. 3, due to a small connection plate 40, the welds 51 between the connection plate 40 and the lead wire 50 may be located above the weld 28 between the periphery of the fill port 24 and the seal plug 25. Still, a thickness Y of the nickel alloy layer 42 of connection plate 40 that is larger than the thickness X of the lead wire 50 will prevent the weld 28 from melting again during the resistance welding of the connection plate 40 and the lead wire 50.

To verify these effects, a lead wire 50 with a thickness of 0.1 millimeters was joined, using resistance welding, to connection plates 40 with thicknesses of 0.15 millimeters, 0.2 millimeters, 0.25 millimeters and 0.3 millimeters (the thicknesses of the nickel alloy layers 42 were 0.1 millimeters, 0.13 millimeters, 0.17 millimeters and 0.2 millimeters, respectively). For the thickness of the connection plate 40 of 0.15 millimeters, the weld 28 between the periphery of the fill port 24 and the seal plug 25 melted during resistance welding; however, for the thickness of 0.2 millimeters or larger, the weld 28 did not melt. Thus, melting of the weld 28 between the periphery of the fill port 24 and the seal plug 25 can be prevented if the thickness Y of the nickel alloy layer 42 of the connection plate 40 is larger than the thickness X of the lead wire 50.

It should be noted that the welding conditions for the connection plate 40 and the lead wire 50 during the above verification test are the optimal conditions for resistance welding for the various thicknesses of the connection plate 40. Specifically, for the thickness of the connection plate 40 of 0.15 millimeters, the voltage is 13 volts and the welding time is 2 milliseconds, while for the thickness of the connection plate 40 of 0.2 millimeters, the voltage is 13 volts and the welding time is 1.5 milliseconds. Further, for the thickness of the connection plate 40 of 0.25 millimeters, the voltage is 11 volts and the welding time is 2.5 milliseconds, while for the thickness of the connection plate 40 of 0.3 millimeters, the voltage is 11 volts and the welding time is 2.5 milliseconds.

In the above experiment, the aluminum alloy layer 41 of the connection plate 40 melted for the thicknesses of the connection plate 40 of 0.2 millimeters and 0.25 millimeters (the thicknesses of the nickel alloy layer 42 were 0.13 millimeters and 0.17 millimeters, respectively). On the contrary, no melt was found in the aluminum alloy layer 41 for the thickness of the connection plate 40 of 0.3 millimeters (the thickness of the nickel alloy layer 42 was 0.2 millimeters). Accordingly, the thickness Y of the nickel alloy layer 42 of the connection plate 40 is preferably twice the thickness X of the lead wire 50 or larger.

Figure 4:
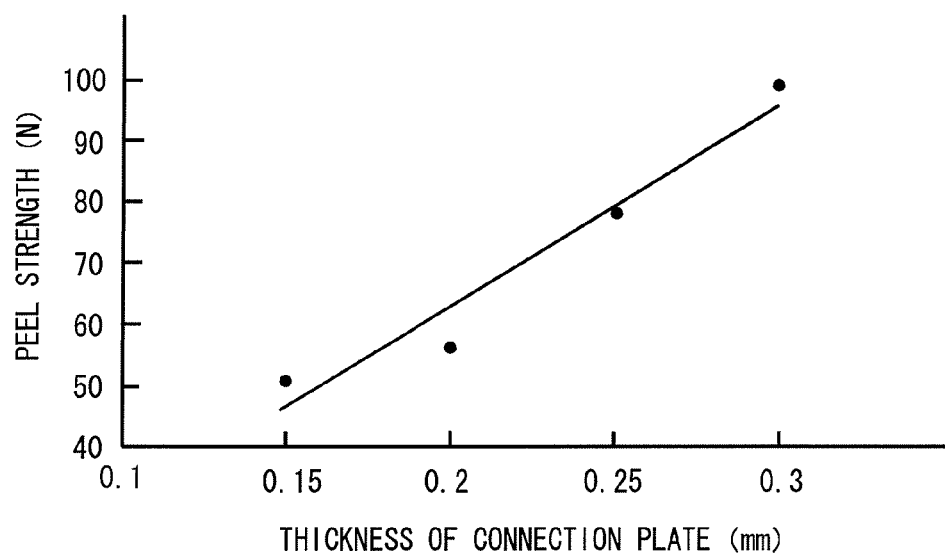
FIG. 4 is a graph indicating the relationship between the thickness of the connection plate and the peel strength of the connection plate.

Also, as described above, a thickness Y of the nickel alloy layer 42 of the connection plate 40 larger than the thickness X of the lead wire 50 will improve the strength of the portions of the connection plate 40 near the welds. FIG. 4 indicates example strengths of the portions of the connection plate 40 near the welds (hereinafter referred to as "peel strength") for the thicknesses of the connection plate 40 of 0.15 millimeters, 0.2 millimeters, 0.25 millimeters and 0.3 millimeters (the thicknesses Y of the nickel alloy layer 42 were 0.1 millimeters, 0.13 millimeters, 0.17 millimeters and 0.2 millimeters, respectively). The peel strengths shown in FIG. 4 are the forces of pulling the connection plate 40 that caused the connection plate 40 to break up, where part of the connection 40 had been welded to a piece of an aluminum alloy.

As can be seen from FIG. 4, the peel strength of the connection plate 40 is larger than 40 N if the thickness of the connection plate 40 is 0.15 millimeters or larger (the thickness Y of the nickel alloy layer 42 is 0.1 millimeters or larger). Since the peel strength of a nickel alloy lead wire 50 with a thickness of 0.1 millimeters is 20 to 30 N, the connection plate 40 according to the present embodiment has a sufficient strength, such that the connection plate 40 does not break up earlier than a lead wire 50 with a thickness of 0.1 millimeters.

Preferably, the thickness of the connection plate 40 is 0.2 millimeters or larger, i.e. when the peel strength of the connection plate 40 is twice the peel strength of the lead wire 50 or larger. Also, since the welding strength between the connection plate 40 and the cap 20 is smaller for larger thicknesses of the connection plate 40, the thickness of connection plate 40 is preferably 1.0 millimeter or smaller.

Figure 5:
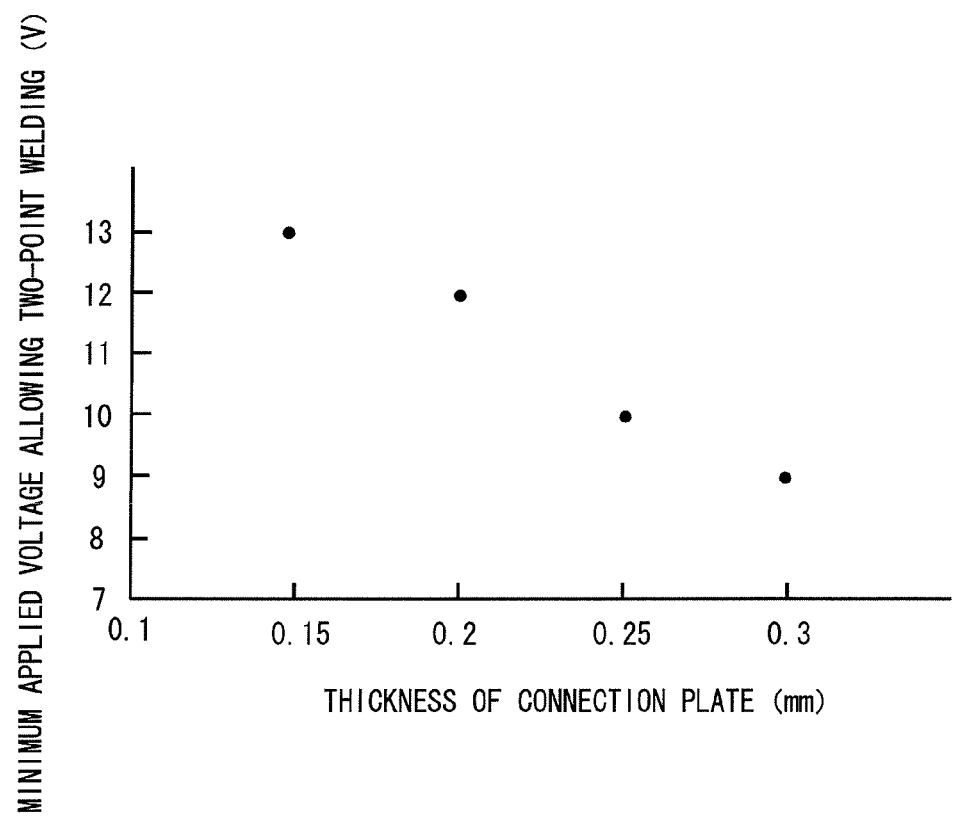
FIG. 5 is a graph indicating the relationship between the thickness of the connection plate and the voltage applied during resistance welding to allow two-point welding.

FIG. 5 indicates the minimum applied voltages to allow two-point welding in a predetermined period of time (1 millisecond in the example of FIG. 5) using resistance welding for the thicknesses of the connection plate 40 of 0.15 millimeters, 0.2 millimeters, 0.25 millimeters and 0.3 millimeters (the thicknesses Y of the nickel alloy layers 42 were 0.1 millimeters, 0.13 millimeters, 0.17 millimeters and 0.2 millimeters, respectively). FIG. 5 shows the test results where a nickel alloy lead wire 50 with a thickness of 0.1 millimeters was joined to connection plates 40 of various thicknesses using resistance welding.

As can be seen from FIG. 5, welding requires smaller energy (voltages) for larger thicknesses of the connection plate 40. In other words, larger thicknesses of the connection plate 40 allow stable welding in a wider range of voltages. Thus, as described above, having a thickness Y of the nickel alloy layer 42 of the connection plate 40 larger than the thickness X of the lead wire 50 will increase the entire thickness of the connection plate 40 compared with having a smaller thickness of the nickel alloy layer 42, allowing the connection plate 40 to be joined to the lead wire 50 more stably using resistance welding.

Moreover, increasing the thickness of the connection plate 40 as described above will prevent part of the connection plate 40 from being deformed due to a bump at the weld formed when the seal plug 25 is laser-welded to the periphery of the fill port 24. Thus, the surface of the connection plate 40 can be kept substantially flat. Keeping the surface of the connection plate 40 substantially flat will allow the lead wire 50 to be tightly attached to the connection plate 40. Thus, the connection plate 40 can be joined more firmly to the lead wire 50 using resistance welding.

Typically, a bump at the weld formed when the seal plug 25 is laser-welded to the periphery of the fill port 24 is approximately 0.04 to 0.05 millimeters high. In such cases, the thickness of the connection plate 40 is preferably 0.2 millimeters or larger so as to keep the surface of the connection plate 40 flat and ensure welding strength between the connection plate 40 and the lead wire 50. Larger thicknesses of the connection plate 40 are more preferable, and thus the thickness is preferably 0.25 millimeters or larger, and more preferably 0.3 millimeters or larger.

Effects of the Embodiment

Thus, in the present embodiment, a connection plate 40 is provided on the cap 20 of the sealed battery 1, composed of a clad material having an aluminum alloy layer 41 and a nickel alloy layer 42 to cover at least part of the seal plug 25 of the fill port 24. As a result, a connection plate 40 for firmly connecting a nickel alloy lead wire 50 to the aluminum alloy cap 20 can be positioned on the cap 20 of the sealed battery 1 without requiring large space.

Furthermore, according to the present embodiment, the thickness Y of the nickel alloy layer 42 of the connection plate 40 is larger than the thickness X of the nickel alloy lead wire 50. This will prevent the weld 28 between the periphery of the fill port 24 and the seal plug 25 from melting again when the lead wire 50 is joined to the connection plate 40 using resistance welding. Accordingly, this arrangement will prevent a gap from forming in the weld 28 between the periphery of the fill port 24 and the seal plug 25 during resistance welding, thus preventing leakage of electrolyte through the gap.

Particularly, having a thickness Y of the nickel alloy layer 42 of the connection plate 40 twice the thickness X of the lead wire 50 or larger will prevent the aluminum alloy layer 41 of the connection plate 40 from melting during resistance welding. This will further prevent leakage of electrolyte through the weld 28 between the periphery of the fill port 24 and the seal plug 25 due to resistance welding.

Moreover, the above arrangement of the connection plate 40 will result in a higher strength of the portions of the connection plate 40 near the welds than the strength of the portions of the lead wire 50 near the welds, thus preventing the connection plate 40 from breaking up.

Further, having a thickness Y of the nickel alloy layer 42 of the connection plate 40 larger than the thickness X of the lead wire 50 will allow the connection plate 40 to be joined more firmly to the lead wire 50 using resistance welding.

Other Embodiments

The embodiment described above is merely an example to illustrate how the present invention can be carried out. Accordingly, the invention is not limited to the above embodiment, and the above embodiment can be modified as appropriate in its implementation without departing from the scope of the invention.

In the above embodiment, the cap 20 is made of an aluminum alloy and the lead wire 50 is made of a nickel alloy. However, the cap 20 and lead wire 50 may be composed of other metal materials. In such a case, too, the connection plate 40 is composed of a clad material made of metal materials that each form one of the cap 20 and lead wire 50.

In the above embodiment, the connection plate 40 composed of a clad material is constructed in such a way that the thickness of the nickel alloy layer 42 is about twice the thickness of the aluminum alloy layer 41. However, other ratios of the thickness of the nickel alloy layer 42 to that of the aluminum alloy layer 41 may be employed.

In the above embodiment, laser welding is used to join the periphery of the fill port 24 to the seal plug 25 at the weld 28 and join the cap 20 to the connection plate 40 at the welds 43, while resistance welding is used to join the connection plate 40 to the lead wire 50 at the welds 51. However, other welding methods may be employed for these welds 28, 43 and 51.

In the above embodiment, the battery case 2 of the sealed battery 1 is shaped as a cylinder with a rectangular bottom with arc-like short sides. However, any shape of the battery case 2 may be employed as long as it allows a negative terminal, fill port and connection plate to be positioned on it.

In the above embodiment, the sealed battery 1 is a lithium ion battery. However, the sealed battery 1 may be other batteries than lithium ion batteries.

The invention claimed is:

1. A sealed battery comprising:
   a battery case in which an electrode assembly and electrolyte are enclosed, the battery case being electrically connected to the electrode assembly for serving as a terminal of one polarity of the electrode assembly;
   an external terminal provided on the battery case in such a way that it is electrically insulated from the battery case, for serving as a terminal of the other polarity of the electrode assembly;
   a sealant member that seals a fill port for the electrolyte provided side by side with the external terminal on the battery case; and
   a connection member which is provided on the battery case to cover at least part of the sealant member and to which a lead wire is to be connected,
   wherein the sealant member is joined to a periphery of the fill port of the battery case using welding,
   the connection member includes a clad material having a layer of the same metal material that forms the battery case and a layer of the same metal material that forms the lead wire, and is welded to the battery case at least at two locations that sandwich a location where the sealant member is welded to the battery case in such a way that the layer of the same metal material that forms the battery case abuts the battery case,
   the lead wire is joined, using welding, with the layer of the same metal material of the connection member that forms the lead wire, between the locations where the connection member is welded to the battery case, and
   locations where the lead wire is welded to the connection member overlap the location where the sealant member is welded to the battery case as viewed looking at the connection member from above,
   the layer of the connection member that is made of the same metal material that forms the lead wire has a thickness twice that of the lead wire or larger.

2. The sealed battery according to claim 1, wherein
the battery case is shaped as a column,
and the external terminal, the sealant member and the connection member are provided on one end of the column-shaped battery case along its axial direction.

3. The sealed battery according to claim 1, wherein
the lead wire is joined to the connection member using resistance welding.

4. The sealed battery according to claim 1, wherein
the fill port has a small diameter portion and a large diameter portion so as to have a diameter changing in two steps as it goes in a thickness direction of a plate constituting part of the battery case, and
the sealant member is formed in steps corresponding to the changing diameter of the fill port, a periphery of the large diameter portion being welded to a periphery of the fill port.

\* \* \* \* \*